United States Patent [19]
Jennes et al.

[11] Patent Number: 5,771,078
[45] Date of Patent: Jun. 23, 1998

[54] VIDEO FRAME GRABBER COMPRISING ANALOG VIDEO SIGNALS ANALYSIS SYSTEM

[75] Inventors: Jos Jennes, Ranst; Paul Wouters, Antwerp; Paul Canters, Turnhout; Herman Van Goubergen, Antwerp; Geert Debeerst, Brecht, all of Belgium

[73] Assignee: Agfa-Gevaert, N.V., Mortsel, Belgium

[21] Appl. No.: 794,148

[22] Filed: Feb. 3, 1997

Related U.S. Application Data

[62] Division of Ser. No. 269,389, Jun. 30, 1994, Pat. No. 5,717,469.

[51] Int. Cl.$^6$ ....................................................... H04N 5/52
[52] U.S. Cl. .......................................... 348/678; 348/679
[58] Field of Search ................................... 348/678, 679, 348/255; H04N 5/52

[56] References Cited

U.S. PATENT DOCUMENTS

| | | |
|---|---|---|
| 4,367,337 | 1/1983 | Sullivan . |
| 4,481,542 | 11/1984 | Goldberg . |
| 4,743,958 | 5/1988 | Bannister . |
| 4,814,875 | 3/1989 | Oldershaw . |
| 4,831,378 | 5/1989 | Baars . |
| 4,872,054 | 10/1989 | Gray . |
| 4,942,468 | 7/1990 | Yokouchi . |
| 4,963,969 | 10/1990 | Kitaura . |
| 4,974,069 | 11/1990 | Shimomura . |
| 5,121,117 | 6/1992 | Rabii . |
| 5,229,853 | 7/1993 | Myers . |
| 5,396,295 | 3/1995 | Furuta . |
| 5,402,249 | 3/1995 | Koseki .................................... 348/255 |
| 5,493,418 | 2/1996 | Takahashi . |

FOREIGN PATENT DOCUMENTS

| | | |
|---|---|---|
| 0263393 | 4/1988 | European Pat. Off. . |
| 0316946 | 5/1989 | European Pat. Off. . |
| 0462784 | 12/1991 | European Pat. Off. . |
| 0528548 | 2/1993 | European Pat. Off. . |
| 0544245 | 6/1993 | European Pat. Off. . |
| 0577841 | 1/1994 | European Pat. Off. . |
| 62-183274 | 8/1987 | Japan . |
| 63-180278 | 7/1988 | Japan . |
| 5-014731 | 1/1993 | Japan . |
| 5-037850 | 2/1993 | Japan . |
| 6-177761 | 6/1994 | Japan . |

OTHER PUBLICATIONS

"Processings of the Third International Congress on Advances in Non Impact Printing Technologies", San Francisco, Graynor, J., pp. 239–245 XP 000043428, Suzuki, E. Color Vkdeo Printer and It's Printing Materials in Canon Still Video System, p. 239, I, Aug. 1986.

"High Level Design Tools for Technology Independent Design" by Holley et al.; Electro, vol. 14, Los Angeles; pp. 1–10, XP 000053977; p. 2, left column, line 1, right column, line 20, Apr. 1989.

"Digital Video Chips Merge Multiple Inputs" by M. Leonard, Electronics Design, vol. 40, No. 10, Cleveland, OH (US); pp. 49–55, XP 000305215, May 1992.

*Primary Examiner*—Sherrie Hsia
*Attorney, Agent, or Firm*—Baker & Botts, L.L.P.

[57] ABSTRACT

In a video frame grabber for digitizing analog video signals which have a pure analog video signal component and a synchronization signal component, the synchronization signals are digitized along with the pure analog video signals. Video gain and offset, sync gain, and sync threshold can be adjusted electronically. A variable time delay can be imposed on the sampling clock signals and on horizontal reference signals. Optimal values can be determined for the various parameters.

5 Claims, 5 Drawing Sheets

VIDEO FRAME GRABBER COMPRISING ANALOG VIDEO SIGNALS ANALYSIS SYSTEM

This is a divisional of application Ser. No. 08/269,389, filed on Jun. 30, 1994, U.S. Pat. No. 5,717,469.

FIELD OF THE INVENTION

The present invention relates to a system for the digitization of analog video signals, having the capability to digitize and analyze the video synchronisation signals in order to derive the analog video signal timings. The analog video signal can represent a black and white image, a color image comprising three monochrome channels: one for red, green and blue, and can be a low, medium or high line rate analog video signal.

BACKGROUND OF THE INVENTION

A system for the digitization of analog video signals is referred to as a video frame grabber. The analog video signals carry the information about an image in such a way that the image can directly be visualised on a video monitor. The digitization is necessary to obtain the image in digital format. In digital format, the image can more easily be processed and stored, and more accurately be transmitted and reproduced on different types of hard copy devices. A lot of systems, including medical systems for radiological diagnosis such as Computed Tomography (CT) and Magnetic Resonance (MR) scanners and ultra sound devices, generate an electronic image of the observed object and display the images for human interpretation on a video monitor. Usually they have no digital image transmission means towards a hard copy device. In these cases it is possible to branch the analog video signals to a video frame grabber, that converts the analog video data to a digital representation of the image. The digital image signals thus obtained can be used to record the image of the observed object on a hard copy, such as a black and white photographic transparent film.

A video frame grabber samples the analog voltage on a bipolar device or physical transmission medium, such as a coaxial bayonet Neil-Concelman connector (BNC) cable having a characteristic impedance of 75 Ohm, or a fibre optic cable, and stores digital image signals, the value of which is for example proportional to the voltage amplitude of the signal on the bipolar device. The analog video signals represent an image. In the most simple case, the full image is given by the analog video signals line by line, the topmost line first. For every image line, first the most left data are given, followed by the data at the right hand side of the given data. The same image is transmitted continuously over and over again, mainly to visualise it continuously on a video monitor. In order to indicate where the data for a full image starts and where a new line for the image starts, extra signals are transmitted together with the analog data representing the image. These extra signals are called synchronisation signals, abbreviated by "sync" signals. Basically, as shown in FIG. 1, there are vertical sync signals—called VSYNC—indicating that the first line of the image will follow, and horizontal sync signals—called HSYNC—indicating that the video data of a next line will follow. It is possible that the VSYNC signals are transmitted over a different physical transmission medium, called the Vertical Drive. Usually, this is a binary signal, that has constantly a high voltage level, a falling edge coincident with the moment of the vertical sync and a rising edge shortly after the falling edge. The time between two falling edges of the vertical sync signal is called the frame period. The time between the falling edge of the vertical sync signal and the rising edge occurring after the falling edge is called the vertical sync tip width.

In the case of a separate VSYNC, also the HSYNC signals are transmitted over yet another physical transmission medium, called the Horizontal Drive. The HSYNC is a binary signal too, having a falling edge coincident with the moment of horizontal sync and a rising edge shortly after the falling edge. The time between two falling edges of the horizontal sync signal is called the line period. The time between the falling edge of the horizontal sync signal and the rising edge occurring after the falling edge is called the horizontal sync tip width. The analog video signals—representing the image—are then carried on a third physical transmission medium, that can be digitized in order to generate the digital image signals. Both sync signals are used to synchronise the sampling operation of the analog video signals.

The HSYNC and VSYNC signals can also be combined on one physical transmission medium, and are then called CSYNC (composite sync) signals. The difference between a HSYNC and a VSYNC signal on a CSYNC signal is indicated by the width difference between the vertical and horizontal sync tip width. In industrial video formats, the vertical sync tip width can be as large as three line periods. Usually, the vertical sync tip width has a minimum duration of a half line period, because serrating pulses at half the line period are introduced, while the horizontal sync tip width has a duration that is only a small fraction of the line period. A video frame grabber must be capable to differentiate HSYNC signals from VSYNC signals. The frame grabber must therefore have information about the duration of the different sync tips. In the case of a separate CSYNC and pure analog video signals, two physical transmission media are necessary to fully define the video image.

The CSYNC signals can also be combined with the pure analog video signals. In that case, only one physical transmission medium carries all the necessary video information, which is called "composite video". The available voltage range is therefore separated into two sub-ranges. A first sub-range—usually lower voltages from 0 mV to 300 mV—is reserved for the sync signals. The other sub-range—usually higher voltages from 300 mV to 1000 mV—is reserved for the pure analog video signals. If a composite video signal is offered, it is important that the video frame grabber can separate the CSYNC signal from the video signal, such that a falling edge in the video data would not be taken for a horizontal or vertical sync signal. Therefore, the video frame grabber must have some knowledge about the voltage sub-ranges mentioned above.

Most analog video signals in medical applications are derived from a digital image in a frame store memory that must be continuously displayed on a video monitor for visual interpretation. A frame store generates analog signals at a rate derived from a fixed base clock within the frame store. This base clock is called the pixel clock of the system. Within a line of the analog video image, at every period of the pixel clock, the next pixel in the corresponding line in the digital image is converted by a digital to analog converter from a digital signal of e.g. 8 bits to an analog signal, e.g. an analog voltage. Depending on the bandwidth of the overall system, the analog signal reaches its target value in a fraction of the pixel clock period after the new pixel value was offered to the analog to digital convertor. For some analog video signals, e.g. those representing a full range on/off pattern for consecutive pixels, the actual minimum and maximum target values cannot be reached due to bandwidth restrictions, whereas for a pattern of two pixels on followed by two pixels off, the target values can be reached.

Usually, the frame store derives from the same base clock the synchronisation signals HSYNC and VSYNC. Therefore, the line period is in most cases an integer multiple of the pixel clock period, and the frame period an integer multiple of the line period, although systems exist that produce analog video signals in which the line period is not such a multiple of the pixel period.

As discussed above, the video frame grabber must have knowledge about the sync tip widths, voltage sub-ranges for CSYNC and pure analog video signals, etc. For one specific video standard, e.g. CCIR 625, all these parameters are well defined and can be fixed in a video frame grabber. Such type of a video frame grabber would be capable to digitize analog video signals only according to this standard. In medical applications, mainly depending on the characteristics of the images, the analog video signals and the sync signals have specific settings for the above mentioned parameters. Therefore, these parameters must be adjusted, installed or made known to the video frame grabber. Some of these parameters are known by the manufacturer of the frame store, some are really installation dependent. Moreover, at is rather inconvenient to gather the information about the frame stores from different manufacturers and offer this information to the technicians installing the video frame grabber. Usually, the determination of the video timings is done manually, with the aid of a general purpose oscilloscope, capable of triggering on common video signals. This is a very tedious work, requires a serious amount of skill of the operator and requires for some video signals a bandwidth of 400 MHz for the oscilloscope. In order to find the most optimal setting for some parameters, it was often necessary to reproduce a digitized image on a high quality hard copy, such as a transparent photographic film. Several tries were necessary to find the optimal setting. If the number of tries was reduced, a sub-optimal setting for the parameter could result. This makes it in some circumstances very difficult or too costly to arrive at the correct settings, resulting in a poor quality of the digitized images. If these images are reproduced on a very sensitive hard copy, such as black and white transparent photographic film, the wrong parameter settings result in clearly apparent artifacts that can degrade the diagnostic quality of the image.

OBJECTS OF THE INVENTION

It is therefore a first object of the invention to provide a system capable to determine the video timings for a wide scala of analog video formats.

It is a second object of the invention to provide a system for digitizing analog video signals, capable of measuring the parameters necessary for the digitizing process.

Other objects will become apparent from the description hereinafter.

SUMMARY OF THE INVENTION

In accordance with the present invention, a video frame grabber system is described, for obtaining digital image signals from analog video signals, composed of pure analog video signals and synchronization signals, comprising:
an analog video digitizer means for digitizing said pure analog video signals into digital image signals; and
a sync signals digitizer means for digitizing said synchronisation signals into digital synchronisation signals.

DETAILED DESCRIPTION OF THE INVENTION

The invention is described hereinafter by way of example with reference to the accompanying figures wherein.

Figure 1:
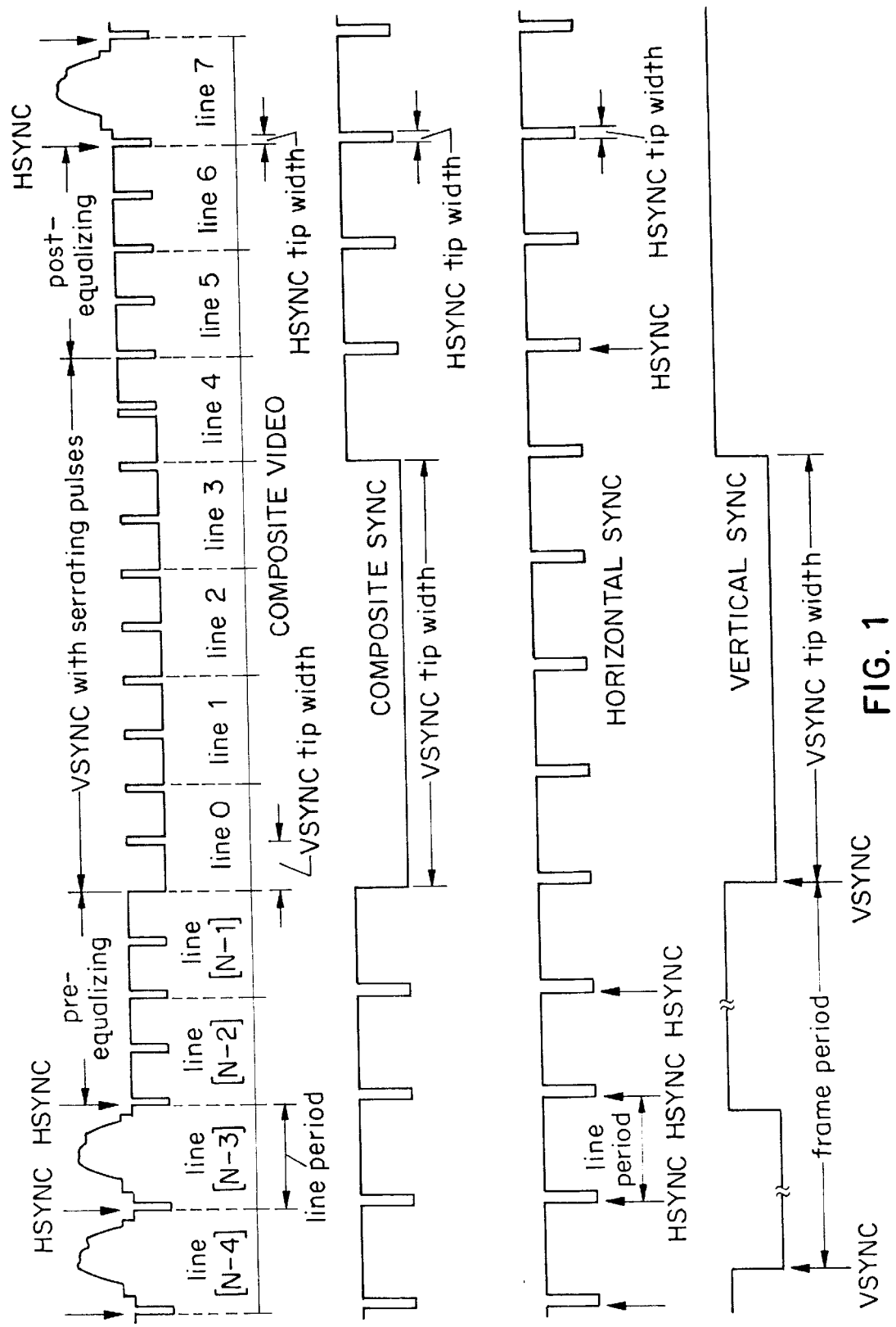
FIG. 1 shows the wave forms of composite analog video signals and timings in the HSYNC, VSYNC and CSYNC signals.
Figure 2:
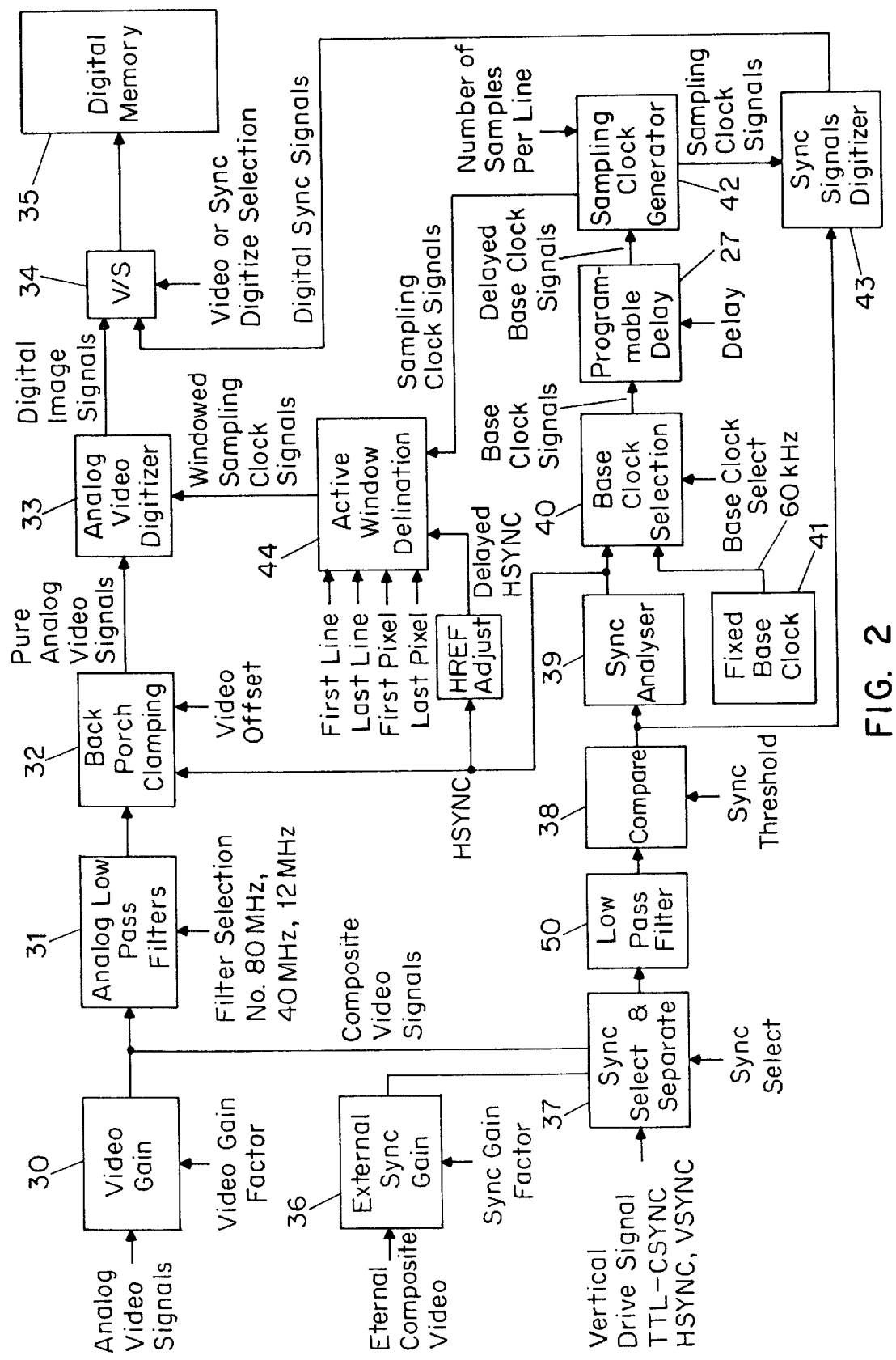
FIG. 2 shows a block diagram for the video frame grabber system according to the current invention.

In FIG. 2 a block diagram for the video frame grabber system according to the current invention is shown. The two most important building blocks are the analog video digitizer 33 and the sync signals digitizer 43. The analog video digitizer 33 receives analog video signals that must be sampled and digitized to deliver digital image signals. The analog video signals that are offered to the video frame grabber system undergo preferentially some transformations, suggested by the blocks in top half of FIG. 2. First of all, the analog video signals must be reduced to a workable area of the analog video digitizer 33. The digitizer expects a low voltage of −2 V and a high voltage of 0 V. If the voltage range of the pure analog video signals is not 2 Volt, the video gain circuit 30 can be adjusted to bring the pure analog video signals within that range. Preferentially, the video gain circuit 30 can amplify or reduce the amplitude of the analog video signals. The video gain factor must thus be variable. In a preferred embodiment, the video gain factor can be set electronically by an eight bit register, capable to store values from 0 to 255, and coupled to a digital to analog converter to deliver a voltage that varies linearly with the digital value. At value 0, a multiplier (not shown) within the video gain circuit 30 is supplied with a voltage of 0.3 V, and at 255, it is supplied with 1.3 V. The analog video signals, re-sized by the video gain circuit 30 are then sent to an analog filter circuit 31. Dependent on the useful bandwidth of the analog video signals, a specific analog low pass filter can be selected to filter the re-sized analog video signals. In a preferred embodiment, the filter selection can be short circuited, giving no filtering effect, a low pass filter with cut-off frequency of 80 MHz, 40 MHz or 12 MHz can be selected. The useful bandwidth of a video signal can preferentially be deduced from the estimated pixel clock frequency by which the analog video signals were generated. The advantage of filtering analog video signals lies in the fact that high frequency noise added to the system can be reduced considerably. The filtered analog video signals are then sent to a unit that clamps to the lowest analog video levels. This is sketched by the back porch clamping circuit 32. This circuit gets the filtered analog video signals and a signal derived from the synchronisation signals. The last signal is useful to indicate at what moment the back porch of the video signal can be sampled. The level of the back porch is the absolute level towards which other analog video levels must be referenced. Within the back porch clamping circuit, two registers (not shown) are installed, the first one indicating the delay, with respect to the HSYNC signal, that must be introduced before sampling the back porch and the second one indicating the time interval at which the sampling must occur. As known in the art, some video formats have a set-up level above the blanking level, that represents absolute black. In order to reference all active video signals with respect to the set-up level, a video offset factor can be installed in the back porch clamping circuit 32. Preferentially, a digital register of eight bits contains a value from 0 to 255. A digital to analog converter, coupled to said register, converts the digital value to a set-up level, that is applied to the filtered analog video signals. The back porch clamping circuit 32 outputs pure analog video signals, that can be digitized by the analog video digitizer 33. Preferentially, this is an eight bit analog to digital converter, with a maximum sampling frequency of 120 MHz. The sampling frequency of the analog video digitizer circuit 33 is imposed by a sampling clock generator 42, generating a rising clock signal at each moment an analog video signal must be digitized. The output of the analog video digitizer circuit are preferentially eight bit digital image signals, that can be stored in a digital memory unit 35 for further processing. The digital memory unit 35 can be random access memory (RAM), hard disk, magnetic tape, etc. The digital image signals stored within the digital memory 35 can be sent to a hard copy device, such as the Agfa LR 3000 laser recorder system, marketed by Agfa-Gevaert N.V. in Mortsel, Belgium, to reproduce the image, represented by the analog video signals, on a hard copy such as a photographic film.

The synchronisation signals follow a different path. They can be derived from the analog video signals, in which case these signals are composite video signals, such as for traditional black and white monitors. These signals can be obtained after video gain re-sizing in the video gain circuit 30. In that case, the video gain circuit can also be used as a sync gain circuit. In the case of three separate analog video signals for RGB color images, the sync signals can be on the green channel, while the red channel must be digitized. In that case, the green analog video signals may need another gain factor than the red channel, which is done in the external sync gain circuit 36. Also vertical drive signals or separate HSYNC and VSYNC signals can be selected in the sync selection and separation circuit 37, to generate a uniform CSYNC. The analog CSYNC signals can preferentially be filtered by a low pass filter 50 different from the analog low pass filters 31, to eliminate high frequency noise. The analog CSYNC signal is supplied to a comparator circuit 38, to convert the analog CSYNC signal to a binary digital signal having value 0 or 1. Low analog CSYNC levels are transformed to a level 0, while high analog CSYNC levels are transformed to a level 1. The discrimination of which analog CSYNC level is low or high, is made by a sync threshold setting within the comparator circuit. Preferentially, the sync threshold value can be set by an eight bit register, containing values from 0 to 255. This register is coupled to a digital to analog converter, that converts the digital value to a threshold level, against which the analog CSYNC values are compared. The digital signals from the comparator circuit 38 can be fed into a sync signals digitizer 43. This digitizer is driven by a sampling clock generator 42 and stores at every rising edge of the sampling clock signal the digital value from the comparator circuit 38 in the digital memory 35. In order to instruct the digital memory 35 which digital values must be stored, a video or sync digitize selection circuit 34 is installed between the analog video digitizer circuit and the sync signals digitizer.

Alternatively, the analog CSYNC signals can also be sent directly to the analog video digitizer circuit 33, where a selector selects whether the pure analog video signals or the analog CSYNC signals must be digitized.

The sync threshold for the comparator circuit 38 and the sync gain factor for the external sync gain circuit 36 can be set, as will be discussed below, such that the threshold is situated in the middle of a rising or falling edge of the analog CSYNC signals. The free choice of the sync gain factor and sync threshold has the advantage that analog synchronisation levels can be sampled such that the synchronization timings are most accurately known. This has an advantage for the sampling of the sync signals in the sync signals digitizer and for the sampling clock generator 42 for the analog video digitizer 33, that derives its base clock from HSYNC signals obtained from the digital CSYNC signals. The digitized CSYNC signals are also fed to a digital sync analyzer circuit 39, that mainly generates HSYNC signals, indicating the falling edge of the HSYNC signals. These HSYNC signals can be selected by the base clock selection circuit 40 to serve as base clock signals for the sampling clock generator circuit 42. The base clock selection circuit 40 can also select a fixed system base clock 41, in the current embodiment having a fixed frequency of about 60 kHz. This fixed base clock 41 is mainly used for serving as base clock when sync signals must be digitized. The base clock signals can then be delayed by a programmable delay circuit 27, in order to sample the analog video signals at the optimal time, as will be described below. In order to save memory space and transmission time for the digital image signals, an active window delineation circuit 44 is installed, that inhibits the sampling clock signals from the sampling clock generator 42 towards the analog video digitizer 33, as long as the analog video signals are outside the active window. This is especially true for the period where HSYNC and VSYNC signals occur in the analog video signals. The active window delineation circuit 44 must reset a pixel counter each time a falling edge in the HSYNC signals occurs. Because the moment of the falling edge and the moment of the rising edge of a sampling clock signal car coincide or occur critically close to each other, a HREF (horizontal reference) delay can be introduced to the HSYNC signal by the HREF adjust circuit 45. Preferentially, the HREF adjust circuit can delay the HSYNC signal with variable delay times, ranging from 7 to 14 nanoseconds in increments of 1 nanosecond. In the following paragraphs we will discuss how the various settings can be optimally chosen based on several video timings, to give high quality digital image signals.

For the determination of several video timings, it is advantageous to digitize and analyze the sync signals. As described above, the sync signals can be given as VSYNC and HSYNC separately, as a composite CSYNC combining VSYNC and HSYNC, or together with the analog video data in a composite video signal. In a preferred embodiment, separate VSYNC and HSYNC are combined to a CSYNC, a given CSYNC is left unchanged and in a composite video signal the sync signals are isolated or stripped off by a sync separator circuit 37. The input of the sync separator circuit is the composite video signal, the output is a CSYNC signal.

Thus, preferentially the three possible situations are reduced in the sync selector and sync separator circuit 37 to a situation wherein a CSYNC signal becomes available.

Figure 3:
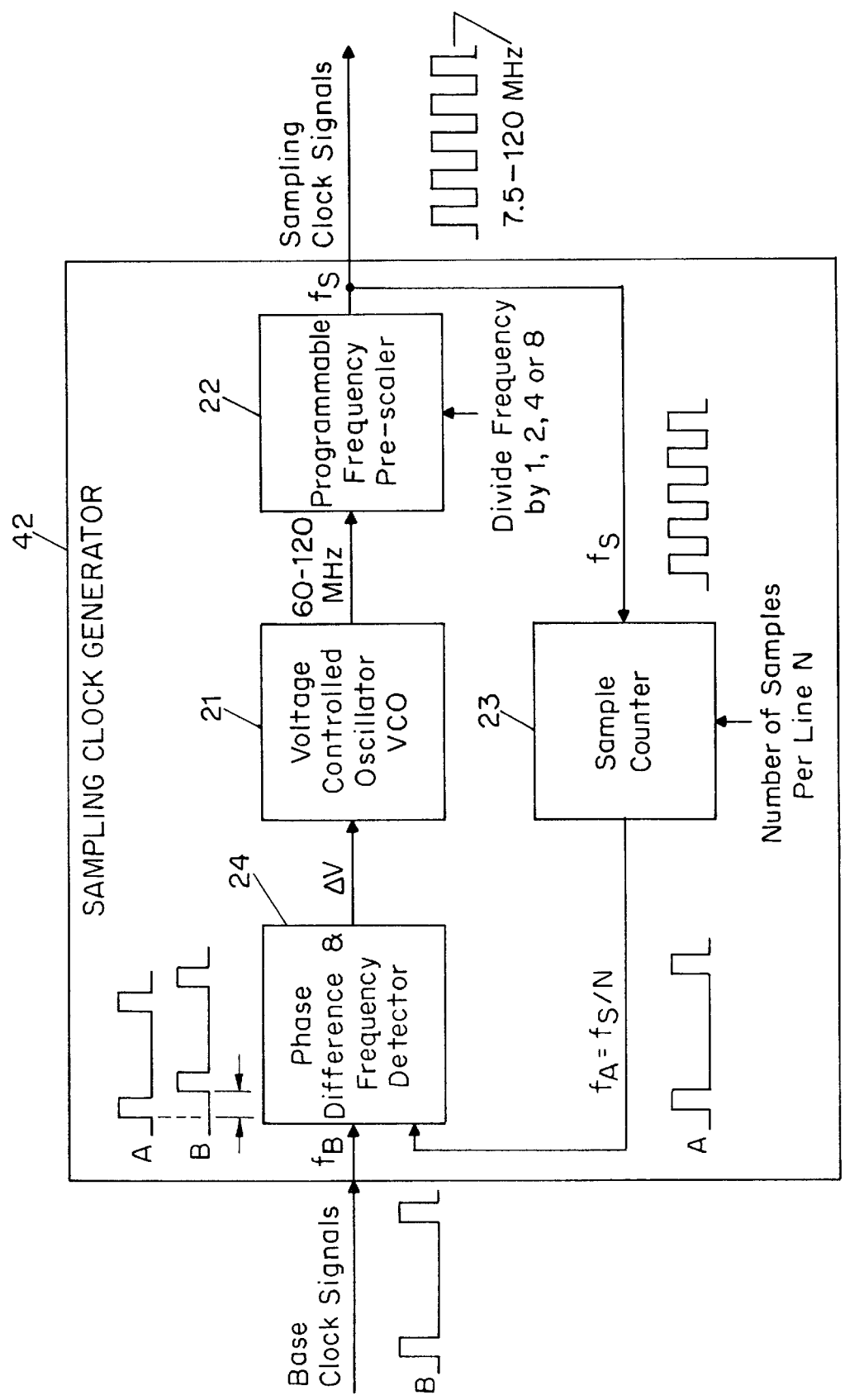
FIG. 3 shows a detail of the sampling clock generator.

The system comprises a sampling clock generator 42, that is preferentially realised as shown in FIG. 3. A sampling clock generator is a system that receives a low frequency base clock signal having frequency $f_B$ and that delivers a high frequency sampling clock signal having frequency $f_S$. The sampling clock frequency $f_S$ is an integer multiple of the base clock frequency $f_B$: $f_S = N * f_B$. In the system of the current invention, the base clock signal can be generated by a fixed base clock 41 or by the falling edges of the HSYNC signals. The sampling clock generator 42 can preferentially be realised as a Phase Locked Loop system as shown in FIG.

3, comprising a Voltage Controlled Oscillator VCO 21, an optional frequency pre-scaler circuit 22, a sample counter circuit 23 and a phase difference and frequency detector 24. The operation of the sampling clock generator circuit 42 is as follows. As will be described below, the phase difference and frequency detector 24 generates a voltage ΔV. This voltage is applied to the VCO 21. According to the voltage applied to the VCO 21, the VCO generates an oscillating signal at its output, the frequency of which is proportional to the applied voltage ΔV. This frequency is typically between 60 and 120 MHz. The oscillating output signal from the VCO 21 is applied to the optional frequency pre-scaler circuit 22. This circuit receives oscillating signals at a certain input frequency and transmits output oscillating signals at the same input frequency, or the input frequency divided by a factor of 2, 4 or 8. The sampling clock signals thus have a frequency $f_S$ that ranges between 60/8=7.5 MHz and 120 MHz. The optional frequency pre-scaler circuit 22 thus broadens the range for the VCO circuit to lower frequencies. The division factor can preferentially be changed easily between the possible values 1, 2, 4 or 8. In a preferred embodiment, the division factor for the frequency can be set electronically, preferentially under control of a microprocessor means. The sampling clock signals $f_S$ are now fed back in the circuit via a sample counter circuit 23. This circuit counts the number of oscillating pulses or the number of rising edges applied to its input, and generates at its output one rising edge as soon as a predetermined number N is reached, and then resets the counter to zero. The output signal is dropped shortly after the rising edge. The output signals A from the sample counter 23 are very similar to the base clock signals B at the input of the sample clock generator 42, and occur at a frequency of exactly $f_A=f_S/N$. The counter value N will be indicative for the number of sample periods within one line period. Preferentially, this value can freely be set under control of a microprocessor means. The phase difference and frequency detector 24 receives both the divided sampling clock signals A and the base clock signals B, and will modify its output voltage ΔV if the rising edge of the divided sampling clock signal A does not coincide with the rising edge of the base clock signal B. The voltage ΔV will modify the output frequency of the VCO in that sense that the time difference between the two rising edges decreases. Once the two rising edges coincide, the frequency output of the VCO 21 is not changed, and $f_A=f_B$ accordingly. Because $f_A=f_S/N$, then $f_S=N*f_S$.

In the system according to the current invention the base clock signals can be generated by the HSYNC signals or by a fixed base clock. The latter is preferentially used when no video timings are known. Initially, the sync signals are sampled at a predetermined sampling clock rate and digitized to a single bit digital or binary value per sample. As described above, the sync signals have a high voltage level and a low level. The characteristics of the electronic circuit are for example such that the binary value is 1 for a high signal level and 0 for a low signal level. A transition from 1 to 0 in the digitized binary signals then indicates a falling edge of the sync signal. In the electronic circuit, a means for adjusting the sync gain of the sync signal and a means for adjusting the sync threshold level are included. The sync gain is incorporated in FIG. 2 in two locations. If the CSYNC signals are derived by the sync selection and separation circuit 37 from the analog video signals, then the sync gain is realised by the video gain circuit 30. Installation of a good gain factor for the analog video signals will result in a good gain factor for the composite sync levels. If the CSYNC levels are derived by the sync selection and separation circuit 37 from an external source, such as can be the case in a situation where in a color RGB signal, the red signal must be digitized and the composite video signals are present only on the green analog video signals. In that case it may be necessary to install a specific gain factor on the external composite video signals from the green signal, by the external sync gain circuit 36. The means for adjusting the gain brings the levels of different types of sync signals into a standard range from 0 mV to 600 mV. As described before, the sync signals accompanying the analog video signals can be retrieved from a composite video signal, from a separate composite sync signal CSYNC or from a horizontal drive signal HSYNC. In a composite sync signal, the low sync level is usually 0 V, the high sync level is typically 300 mV. In that case, the sync signal must not be attenuated and a maximum gain value is installed. The means for adjusting the gain comprises an 8 bit register. This way, values from 0 to 255 can be put into this register. A value 255 means that the sync signal is not attenuated. A voltage of 1.3 V is supplied to a multiplier circuit (not shown) within the video gain circuit 30. For a digital value of 0, a voltage of 0.3 V is supplied to the multiplier circuit. Any other value N, means that the sync signal is attenuated. A separate CSYNC sync signal or a horizontal drive signal is usually a transistor-to-transistor logic (TTL) signal. This ranges from 0 V to 5 V. In order to reduce this range from 0 V to 600 mV, a value N=30 can be installed in the external sync gain circuit 36. It is also possible that no external sync signal is used for the digitization of the image. In that case, the gain value can be set to zero. The zero setting reduces the noise that can be introduced on the system by the sync signals.

Once the gain value N is set, the threshold value within the comparator circuit 38 for the sync levels can be determined. The threshold value corresponds with a certain voltage level. Sampled gain corrected sync signals above this threshold voltage will be digitized to a value 1, while sync signals below this level will be digitized to a value 0. Preferentially, the threshold level voltage can be varied between 0 mV and 400 mV. The exact setting can be done by another register of 8 bits, allowing values from 0 to 255 to be installed. A value of 0 corresponds with a threshold level of 0 mV, while a value of 255 corresponds with a threshold level of 400 mV. Usually, the value 96 is installed, corresponding with a 150 mV threshold voltage level. This value renders the system practically immune to noise on mainly the upper and lower portions of the sync edges. For a sync pulse of 300 mV high, the threshold voltage level of 150 mV is half way this height.

Figure 4:
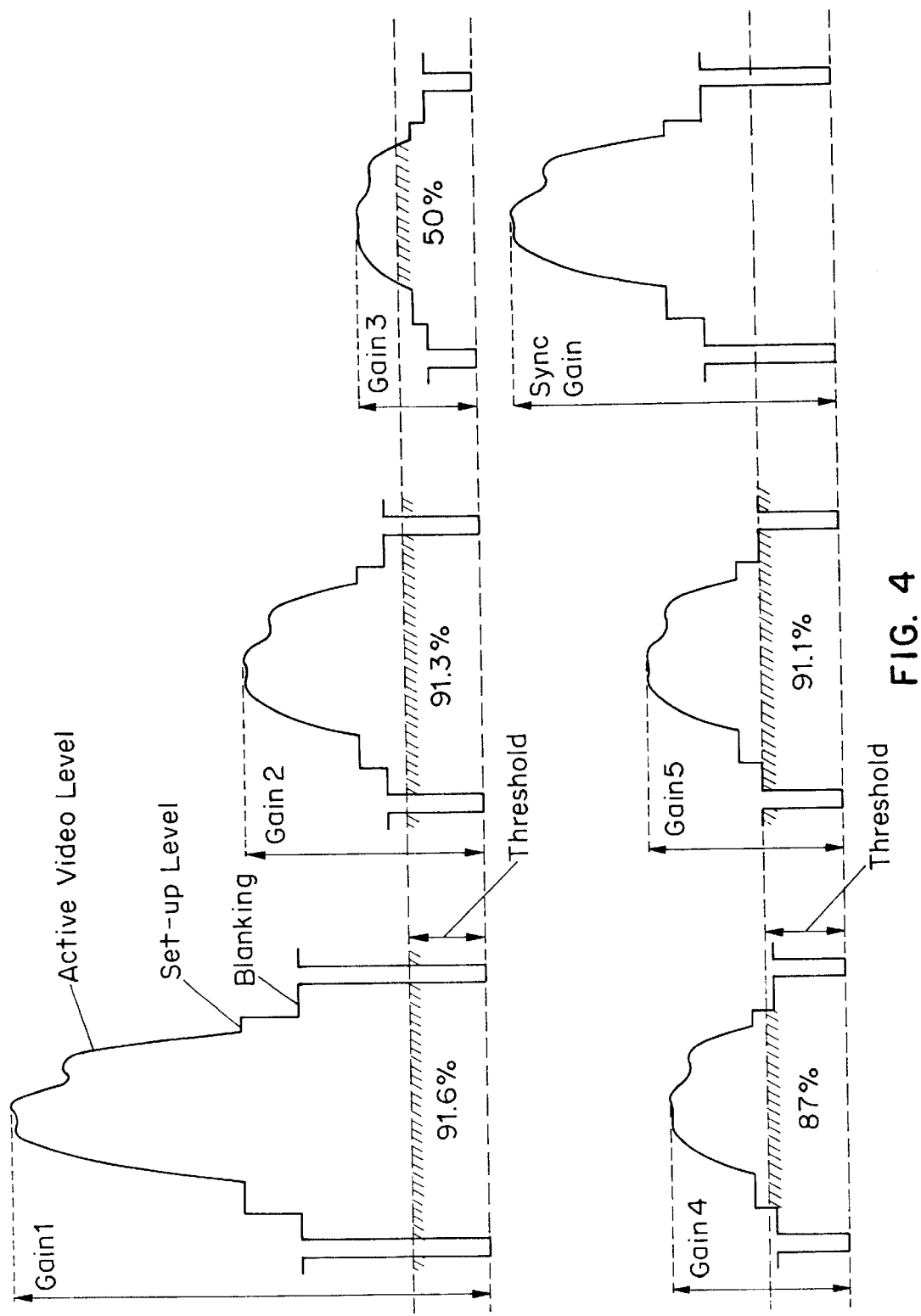
FIG. 4 shows the analog composite video signals at different gain settings.

Preferentially, the following automated procedure is followed to determine the sync threshold level in the comparator circuit 38 and the sync gain factor in the video gain circuit 30 or the external sync gain circuit 36. A fixed threshold level is installed, preferentially corresponding to the value 96. This threshold level is kept constant for the whole procedure. The gain factor is varied from the largest factor to a smaller factor until the gain factor is found that makes the threshold level to coincide with the blanking level. The procedure is started with a maximum gain factor, e.g. corresponding with a gain number 255. This large gain factor gain1, as shown in FIG. 4, will keep the lowest voltage of the sync tips at about 0 Volt, surely below the fixed threshold level, while the blanking level, set-up level and active video levels will be well above the fixed threshold level. The sync signals are sampled with a sampling clock derived from a fixed base clock. The fixed base clock in the current embodiment has a frequency of about 60 kHz. Preferentially, the fixed base clock, the frequency pre-scaler value (1, 2, 4 or 8) and the sample counter value within the sampling clock generator 42 are selected such that the sampling clock generates about one million samples for one frame period. A frame period is typically 1"/25 or 40 ms. One sample per 40 nanoseconds can be acquired, with a sampling clock of 25 MHz. All gain corrected analog sync signals below the threshold level will be digitized giving a digital value 0, and all signals above the threshold will result in a value 1. With the high sync gain setting gain1 in FIG. 4, only the sync tips will result in 0, while all other levels will result in 1, as shown by the shaded area. With this maximum gain setting gain1, a first percentage $P_1$ of samples having value 1 is recorded. In FIG. 4 this percentage is for example 91.6%. This percentage $P_1$ is kept for absolute reference with respect to other percentages. The gain setting is decreased to gain2, as shown in the next diagram of FIG. 4, the sync signals are digitized again and a second percentage $P_2$ of samples having value 1 is recorded. As the gain decreases to gain2, the blanking level of the sync signals will decrease and approach the threshold level. If the blanking level is still higher than the threshold level for a gain setting gain2, the second percentage $P_2$ may be lower e.g. 91.3%, due to sloping sync edges, but will not be very different from the first percentage $P_1$. In that case, the gain setting is further decreased to a gain factor gain3, and after digitizing the sync signals, a third percentage $P_3$ is computed. If the blanking level is below the threshold, then not only the sync tips will result in zero digital values, but also the analog video signals where the level is at the blanking level, such as the front porch and the back porch of the horizontal sync signals. Both front and back porches are usually quite large, and occupy together about 4% of the total line period. In that case, the percentage $P_3$ of digital values 1 will be considerably lower than $P_1$. In the third diagram of FIG. 4, this percentage is 50%. If that percentage $P_3$ is 4% lower than $P_1$, then we assume that the gain corrected blanking level is below the threshold level. By binary searching, illustrated by the diagrams according to gain4 and gain5, we find the gain level $G_c$ at which the percentage $P_c$ first considerably changes. This gain setting is then multiplied by a factor of 1.67, giving "sync gain" in FIG. 4, in order to situate the threshold level somewhere between the gain corrected sync tip level and blanking level.

Once a workable sync gain and sync threshold value are installed, the digitized sync signals can be used to find the line period and the frame period. For this purpose, the falling edges or transitions from 1 to 0 in the digitized sync samples are located, and the distance between each two consecutive transitions is recorded in distance classes. The distance is the number of samples between two transitions. A distance class gathers all distances between two limits. The most crowded class is that with distances caused by horizontal sync signals. The mean distance within this class, together with the sample period of the sampling clock signals, gives a good approximation of the line period, or reciprocally the line rate of the video signal. The start of the horizontal syncs is located at the 1 to 0 transition that has a distance to the previous and next transition belonging to this class. This way, all horizontal sync signals can be located. The vertical sync signals have a vertical sync tip that is considerably larger than the horizontal sync tip. The width of a horizontal sync tip can be found by searching for the first 0 to 1 transition. The total width of a vertical sync tip is at least the distance from the vertical sync to the next 0 to 1 transition. It is possible that within the low level vertical sync tip, narrow high level serration pulses are introduced, for stabilisation purposes of the video monitor. These occur a half or one full line period of time after the vertical sync. If two or more frames are digitized, two vertical sync signals can be located, and the frame period can be derived accordingly. The frame period divided by the line period gives the number of lines per frame in the video format. For an industrial video format derived from a 625/50 Hz CCIR standard format, the system of the current invention finds an approximate line time of 64.2 microseconds, giving a line rate of 15 kHz. The HSYNC tip is measured to have a width of 4.8 microseconds. By the absence of serration pulses during the vertical sync, the system derives that the video format is of an industrial type, whereas standard CCIR format does have serration pulses at twice the line frequency during the vertical sync period. According to the presence or absence of serration pulses, a circuit (not shown) is set within the sampling clock generator 42, in order to further enable respectively disable the frequency correction circuit within the sampling clock generator circuit. If the serration pulses are not present, the sampling clock generator 42 is set in "halt" mode, i.e. the voltage controlled oscillator is not corrected for frequency deviations from the moment that the vertical sync period is detected until the end of this period. The number of lines computed from the line period and the frame period gives 624 lines, with an accuracy better than 0.1%. Further analysis reveals that the video format is non-interlaced and has two frames with 312 lines per frame. The best estimation for the line time is 64.135 microseconds, and correspondingly a line rate of 15.592 kHz. The frame time observed is 20.010 milliseconds. The system can further derive from the digitized sync signals that the video format has a VSYNC tip width of 192.4 microseconds, corresponding to three lines.

The number of lines per frame gives an indication about the video format. The higher the number of lines per frame, the higher the pixel clock at which the video data has been generated. The number of lines can be arranged in consecutive disjunct sets. With every set, a frequency interval [$f_{LOW}$, $f_{HIGH}$] can be associated. We assume that a video format with a specific number of lines per frame can have a pixel frequency only within the associated frequency interval. The frequency intervals for different sets can have overlapping frequencies. The sets and frequency intervals can be stored in an internal table and the frequency interval can be retrieved as soon as the number of lines per frame is known. In the above example, we found that the number of lines was 624. Accordingly, the number sampling clock signals to be generated per horizontal line period is estimated to be in the interval [481,1100]. Together with the line rate found of 15 kHz, this results in possible sampling frequencies in the interval [7.2 Mhz, 16.5 MHz].

The knowledge of the horizontal sync tip width and the line period, allows us to set in the sync analyzer circuit 39 the conditions when a sync tip must be considered as a horizontal sync and when as a vertical sync. For the above described example, the VSYNC detect setting can be installed as 11.6 microseconds. This means that the sync analyzer circuit 39 will consider the sync tip as a vertical sync rather than a horizontal sync if the sync tip has a width larger than 11.6 microseconds, which is nearly 2.5 times larger than the estimated horizontal sync tip width. Another parameter that can be installed in the sync analyzer circuit 39 is the half line lockout period. Most video formats have before and after the vertical sync a number of pre-equalizing and post-equalizing sync signals right in the middle between two horizontal sync signals. To avoid that these signals are considered as horizontal sync signals and disturb the behaviour of the sampling clock generator, the detection of sync signals can be disabled for a certain portion of the line period, which is called the half line lockout period. In our example, the line period was estimated to be 64.2 microseconds. The half line lockout period is set to 50.4 microseconds accordingly.

After setting the above mentioned video timing parameters, an image can be captured and digitized in a synchronised way, albeit the correct pixel clock is not known. The purpose of the video gain and video offset circuits is to use the analog digital convertor (ADC) in the analog video digitizer circuit 33 at its full range. If the minimum specified voltage $V_{MIN}$ is applied to the ADC, then it will output digital value 0. If the maximum specified voltage $V_{MAX}$ is applied to the ADC, it will output digital value 255 for an 8-bit ADC. The voltage U of the analog video signals range however from $U_{MIN}$ to $U_{MAX}$, that can be different from the above specified voltages for the ADC. The interval [$U_{MIN}$, $U_{MAX}$] must be mapped linearly to the interval [$V_{MIN}$, $V_{MAX}$]. The video gain is preferentially incorporated directly at the input of the frame grabber system, whereas the video offset is incorporated preferentially in the back porch clamping circuit. The HSYNC signals obtained in the sync analyzer circuit 39 by analysing the SYNC signals, together with programmable delays, indicate where the back porch starts. The blanking level is sampled over a programmable averaging period and stored by the back porch clamping circuit doing DC restoration. All analog video signals will be referenced with respect to this level. If the video format has a set-up level of 0 V above the blanking level, then a zero video offset can be set in the back porch circuit 32. If however the video format has a set-up level higher than 0 V, a zero video offset setting will result in the use of only a partial range of the ADC. In the current embodiment, the lowest video signals will be digitized to digital values higher than zero. If the digitization of analog video signals representing an image using the full dynamic range of the video source results in a digital image having a minimum higher than zero, this is an indication that the video format has a substantial set-up level, which must be corrected by the video offset factor.

To find optimal settings for the video gain factor and video offset, it is necessary that the analog video signals, transmitted to the video frame grabber, cover the full range of video levels. This can be achieved for example by displaying a black image with white text or graphics or vice versa, or by displaying a test image like Society of Motion Picture and Television Engineers, Inc. (SMPTE) test image that contains the highest and lowest video levels.

In an iterative process, the active window of the video format is determined, together with the optimal settings for the video gain in the video gain circuit 30 and video offset in the back porch clamping unit 32. The active window is defined by those video lines and those pixels within the video lines that actually carry relevant image information. Usually, the analog video signals of the lines not belonging to the active window are set to display black, which corresponds to a level equal to the set-up level of the video format. Also the video signals in each line, preceding and following the active video signals, will have a level close to the set-up level. Therefore, all data outside the active window will be displayed black on a video monitor. Moreover, in order to find the active window, analog video signals must be generated that correspond with an image filling the active window. The topmost and bottommost lines of the image must contain at least some grey or white pixels. Also the most left and most right pixel of at least one line within the active lines must be grey or white. The image must contain completely dark areas and completely white areas, in order to find the correct video gain and video offset settings.

First the image is captured with the largest possible settings of number of active video lines and number of active video pixels. These settings are installed in the active window delineation circuit 44. A video offset of 0 is installed in the back porch clamping circuit 32 and a video gain of 0 is installed in the video gain circuit 30, corresponding to a voltage of 0.3 V supplied to the multiplier circuit. The image is digitized into digital values and the maximum value for the digital values is searched. In the above mentioned example, we found for these settings a maximum digital value of 104. A new video gain setting is computed, such that the maximum digital value will be close to 220. We find a video gain setting of 81, by taking into account that a setting of 255 will supply a voltage of 1.3 V to the multiplier circuit within the video gain circuit 30, while the video offset is still at 0. The same analog video signals are digitized with these new settings, and the maximum digital value detected is now 219. For a first iteration on the video gain and offset, these values are satisfactory. A first iteration to find the active video window is then started. Within the digital image signals, the digital values of the first video lines are examined. If the first line of the digital image does not contain at least three pixels having digital value 73, being one third of the maximum value (219) within the image, then this line is omitted from the active window. The same method is applied to the following digital lines, until a line is found with at least three digital values larger than 73. We find that the 32 top lines do not belong to the active video window. The same method is applied, starting from the bottom lines. For the current example, 28 bottom lines are found to be outside the active window. A frame of 312 lines results in this case in 252 active lines. Within each of the remaining active lines, the first pixel number is found that has a value larger than 73. The minimum value of these numbers over all active video lines is taken to be the first active pixel in each line. The above example results in 232 start pixels not belonging to the active window. The same method is applied to the trailing pixels of each video line, and 84 pixels are found to be outside the active window. The values found, delineating the active window, are installed in the active window delineation circuit 44 and the same analog video signals are captured within the active video window at the highest frequency level $f_{SIGN}$ from the above determined frequency interval, with the video gain factor gain1 and video offset offset1 found in the first iteration. The digitized data are analyzed to find the minimum digitized value $D_{MIN}$ and the maximum digitized value $D_{MAX}$. Based upon the settings of $gain_1$ and $offset_1$, and the values $D_{MIN}$ and $D_{MAX}$, new settings for $gain_2$ and $offset_2$ are computed and installed in the video frame grabber, such that at a new capture of the image $D_{MIN}$ will be closer to but still higher than the lowest possible output value of the ADC and $D_{MAX}$ will be closer to but still lower than the highest possible output value of the ADC. This process can be iterated until a video gain and video offset are installed such that $D_{MIN}$ and $D_{MAX}$ exactly coincide with the minimum and maximum possible output levels of the ADC. In the above example, with a video offset value 0 and a video gain factor of 107, the maximum digital value level is 253, and the minimum level is 0. These video gain and video offset settings are appropriate for the next steps in the procedure to establish the video parameters.

The next steps are intended to determine the pixel frequency at which the analog video signals were generated. By selecting the HSYNC signals in the base clock selection circuit 40 as base clock signals, the sampling clock generator 42 generates sampling clock signals having a period being a multiple of the line frequency. As discussed above, this is obtained by installing an integer value N in the sample counter circuit. If the line period of the analog video signals is exactly an integer multiple M of the pixel clock period imposed by the frame store, generating the analog video signals, and the installed counter value N equals to M, then the sampling clock period of the video frame grabber is made equal to the pixel clock period of the frame store and the analog video signal can be sampled correctly. If the integer value N installed in the counter circuit within the sampling clock generator is one short N=M−1, some of the analog signals within one image line will be digitized during their rise time, before they are stabilised, while other signals are sampled at the correct moment and other signals are sampled in the falling edge. This will introduce artifacts, commonly referred to as moire. These artifacts will occur more frequently within one image line if the integer value N differs with two units from the correct value M. To avoid these artifacts it is of utmost importance to determine exactly this integer value, which is referred to as the number of pixels per line.

Therefore, an image must be transmitted, having a substantial amount of fast transients within one line or within consecutive lines. Fast transients in the video signal are present in text lines, specific parts of test images and graphics within the image. The lines having fast transients or large ramps can be located automatically by sampling the analog video signals of the complete image or a portion of the image—preferentially within the active video window—at a relatively high frequency, preferentially $f_{HIGH}$, and counting per video line the amount of digitized pixel clusters consisting of four consecutive pixels that have a difference, between the minimum and maximum digital value within the cluster, above a certain threshold. The lines having the largest amount of such pixel clusters are selected as representative for having the most transients. For the analog video signals of the current example, lines 5, 8, 248, 249 and 250 are found to contain the most transients.

The sampling is performed in synchronisation with the video signal. Therefore, in FIG. 2, the HSYNC signal is selected as the base clock signal for the sampling clock generator 42. The actual sampling clock frequency $f_S$ is determined by the settings of the frequency pre-scaler circuit 22 and the sample counter circuit 23 in FIG. 3. The video frame grabber further comprises a programmable delay circuit 27 that delays the base clock signal over a few nanoseconds. The purpose of this delay circuit 27 is to match the phase of the internally generated sampling clock signals with the phase of the incoming analog video signals, once the optimal sampling clock has been established. Preferentially, the base clock signal can be delayed with several delay times, ranging from 0 nanosecond to 128 nanoseconds with increments of 0.5 nanoseconds. The programmable delay circuit 27 allows also to virtually increase the sampling clock frequency, even if this does not match the pixel clock frequency. If for example the sampling clock generator 42 generates a sampling clock at 50 MHz, then every 20 nanoseconds a sample from the pure analog video signals is digitized in a first set of digital image signals. If the programmable delay circuit is set to delay the base clock signals over 10 nanoseconds, the sampling clock signals will also be delayed by 10 nanoseconds and the same analog video signals are digitized in a second set of digital image signals, then the first and second set of digital image signals can be combined to a set giving a sample every 10 nanoseconds, thus representing digital image signals virtually sampled at 100 MHz. By setting the time delay to 5 and 15 nanoseconds for obtaining a third and fourth set of digital image signals, the digital image signals of these last two sets can be combined with the first two sets to represent signals virtually sampled at 200 MHz. Preferentially, the number of phase shifts is selected such that the virtual frequency is about twenty times higher than the actual sampling clock frequency $f_{HIGH}$. Although the phase shift can be installed with an accuracy of 0.5 nanoseconds, the actual time offset between samples of different sets is not exactly the phase shift difference as installed. This is due to the exact time when the horizontal sync crosses a certain threshold level and due to slight frequency variations of the sampling clock generator. To reduce these random variations, the selected video lines are digitized several times with the same phase shift setting. The digital values obtained in each set are averaged over the set. In the current example, the video image is sampled by installing in the sampling clock generator a value of 1082. Because the line rate is 15.592 kHz, this corresponds with a sampling frequency of 16.87 MHz, or a pixel period of 59.27 nanoseconds.

In the combined set of digital image signals, the fast transients are located by searching the locations of steepest gradient. The location of a specific intermediate digital value, e.g. 128, in each rising edge is estimated. Preferentially, the minimum $D_{MIN}$ and maximum $D_{MAX}$ digital pixel values within the image line are found, and the intermediate digital value is chosen to be the mean value of $D_{MIN}$ and $D_{MAX}$. The distance in pixels between rising edges can be reduced to a time interval, by the knowledge of the sampling clock frequency and the several phase shifts introduced. Alternatively, the time intervals between falling edges of the transients are established. Each time interval found must be an integer multiple of the pixel period, being the reciprocal of the pixel frequency $f_P$. From these multiples, a list of candidate frequencies $f_i$ for the exact pixel frequency $f_P$ can be derived. This list will typically include $f_i=f_P$, $f_P*2$, and sometimes—mainly depending on the graphical patterns within the line—$f_P/2$, $3*f_P/2$ etc, with small variations on the exact value. For the current example, we found 67 rising transient edges and 67 falling transient edges. The first candidate frequency had 720 sampling clock signals per line period, another candidate frequency varied between 1072 to 1086, or about 3/2*720. Because the variation was too large, these last candidates were already eliminated from further examination.

Due to these small variations, the value for the candidate frequency, 720 sampling clock periods per line period in the above example, must be optimised. Each candidate frequency $f_i$ (e.g. 720 and 1080) is optimised separately, by setting the frequency pre-scaler circuit 22 and varying the counter value in the sample counter circuit 23. If the candidate frequency is higher than 60 MHz, the frequency pre-scaler circuit is set with the divider value of 1. If $f_i$ is within [30 MHz, 60 MHz], the divider value is set to 2, within [15 MHz, 30 MHz] value 4, and within [7.5 MHz, 15 MHz] the pre-scaler value 8 is installed. The candidate counter value $N_i$ is computed from the known HSYNC frequency $f_H$ and the candidate pixel frequency $f_i$: $N_i=f_i/f_S$. An improved counter value $N'_i$ is derived from the candidate counter value $N_i$ as follows. For a number of neighbouring counter values $N_i+j$, with j positive and negative integer values, a fitness score $S_j$ is computed. For this purpose, the counter value $N_i+j$ is installed in the sample counter circuit 23. Also a first phase shift value is installed in the programmable delay circuit 27. One or several video lines containing the largest amount of fast transients is digitized with these settings. From the thus obtained digital image signals a first grey score is computed. The grey score is a number that has a large value if the number of intermediate grey level values surpasses the number of low and high grey level values in the digital image signals. This grey score GS can preferentially be computed as a sum of transformed digital grey level values. The transformed digital grey level values get a high value if they correspond with an intermediate grey level, and a low value when they correspond with an extreme high or low grey level. Therefore, the minimum $D_{MIN}$ and maximum $D_{MAX}$ digital value for the whole digitized image or the digitized line are searched. Because the image probably contains consecutive pixels in one video line having the largest signal value and the same for the lowest signal value, whatever the sampling clock and phase delay settings are, the digitized values $D_{MIN}$ and $D_{MAX}$ are representative for the whole image, whatever the sampling clock and phase delay for digitizing may be. Preferentially, $D_{MIN}$ is incremented by a certain percentage of the $[D_{MIN}, D_{MAX}]$ interval, and $D_{MAX}$ is decreased by the same amount, to avoid that pixels, that don't reach the maximum or minimum level, even at the optimal phase setting, get a bad score. This percentage can be for example 12%. The mean value $D_{MID}=(D_{MIN}+D_{MAX})/2$ is also computed. For digital image signals ranging from $D_{MIN}$ to $D_{MAX}$, the levels L from $D_{MIN}$ to $D_{MID}$ are then linearly transformed from 0 to 100, the levels from $D_{MID}$ to $D_{MAX}$ are linearly transformed from 100 to 0. All digital levels below $D_{MIN}$ or above $D_{MAX}$ are transformed to 0. The grey score GS can be computed preferentially by using a look up table that is generated to transform the digital image signals according to the above described rules. The look up table transforms all digital values not higher than $D_{MIN}$ to 0, all digital values not lower than $D_{MAX}$ also to 0, a digital value $(D_{MIN}+D_{MAX})/2$ to 100, and all digital values between $D_{MIN}$ and $D_{MAX}$, such that two linear functions are established. The look up table is constructed such that small deviations from $D_{MIN}$ and $D_{MAX}$, caused by noise, over- and undershoots, are not as critical as large differences due to sampling in the rising or falling edges. In the same way as the first phase setting $\Phi_1$ gives a first grey score $GS_1$, a second phase setting $\Phi_2$ gives a second grey score $GS_2$ etc. About twenty phase settings are equally distributed over the sampling period, being the reciprocal of the sampling frequency. The largest $GS_{MAX}$ and smallest $GS_{MIN}$ grey score GS found for the about twenty different phase settings are selected. The fitness score $S_j$ for the selected counter value $N_i+j$ is computed as the difference between the largest and the smallest grey score $S_j=GS_{MAX}-GS_{MIN}$. The counter value $N_i+k$ giving the largest fitness score $S_k$ is selected as the optimal choice for the neighbouring counter values according to the candidate frequency $f_i$. The optimised frequency is thus $f'_i=(N_i+k) * f_H$, wherein $f_H$ is the horizontal sync frequency. The ground for this criterium can be explained by noting that for the correct pixel clock, there is a large difference between the amount of grey when sampling fast transients with the correct phase (almost no grey) and the worst phase (grey at each edge). When fast transients are sampled at the wrong pixel clock, there will be some grey at each phase setting and the difference between the 'best' and the 'worst' phase won't be very pronounced. In the example, the scores found for 717 . . . 723 samples per line period are respectively 4068, 6247, 6741, 24714, 10836, 6432 and 4771. The highest score of 24714 corresponding with 720 samples per line period is definitely the best choice with a line rate of 15.592 kHz, the sampling frequency is thus 11.2 MHz. If the counter value range [1072,1086] were handled, probably 1080 would be found as best counter value.

Once the row of optimised frequencies $f'_i$ is established (e.g. 720 and 1080 samples), one of these must be established as the most probable pixel frequency. For this purpose, the video lines having the most fast transients are digitized again, for a first selected optimised frequency $f'_1$, and for a fixed amount of different phase settings equally distributed over the sampling period. For each phase setting $\Phi_j$, a grey score $GS_j$ is computed in the same way as described above. The minimum grey score $GS_{MIN,1}$ corresponds with the most probable correct phase setting for this optimised frequency $f'_1$. This value $GS_{MIN,1}$ is divided by the number of samples $N'_i$ in the current line, which gives the average amount of grey per sample: $GS_{MIN,1}/N'_1$. This procedure is repeated for any other optimised frequency $f'_i$, and the frequency $f'_i$ giving the smallest amount of grey per sample $GS_{MIN,i}/N'_i$ is selected as the optimal choice for the sampling clock frequency. It is important to compute the amount of grey per sample, because the candidate frequencies $f_i$ are typically quite different, such that the number of samples per line and the possible total amount of grey, is quite different for each frequency. The sampling frequency found by this procedure is the best match found for the pixel clock frequency, by which the analog video signals were generated. Henceforth, this sampling frequency will be used to sample the analog video signals. Even in the case where the line period is not an integer multiple of the pixel period, but e.g. $M=728.333 \ldots$, the method of the current invention will find two candidates $N_1=728$ and $N_2=729$. The first candidate $N_1$ will get the highest score and is actually the best choice that can be made for sampling the analog video signals.

As said before, the analog video signal reaches its target value in a fraction of the pixel clock period after each new pixel value was offered to the analog digital convertor in the frame store generating the analog video signal. Therefore, it is important to sample the analog video signal in the frame grabber at the correct moment during the sampling clock period. This moment or time delay with respect to the rising edge of the sampling clock is commonly referenced as the phase. If the phase is set wrongly for the sampling of the analog signal, it is possible that the analog signal is sampled during its rise time. Fast transients in the image, caused for example by the presence of sharp edges, white graphics on a black background or vice versa or more specifically text in the image, will be degraded if they are sampled in the rise time or on the falling edge. Instead of sampling exclusively a high analog level or a low level, intermediate levels will be sampled, giving values in the digitized image that correspond with greyish tones instead of contrasting black or white. Preferentially, all samples are taken with the same phase delay. The programmable circuit 27 shown in FIG. 2 allows a fixed phase shift for all samples. The phase shift register can delay the sampling clock signals with a time delay of up to 128 nanoseconds, with increments of 0.5 nanoseconds. The optimal phase setting is found by an iterative procedure. Again, it is necessary that analog video signals are transmitted that contain at least one video line having fast and considerable transients. Preferentially at least five lines must contain such transients. This can be either realised by transmitting analog video signals representing a test image containing on/off patterns, or representing an image containing graphics or text. Preferentially the five video lines having the highest amount of transients are selected by a procedure as described above. These lines are digitized by the analog video digitizer 33 at a sampling rate imposed by the sampling clock generator 42. The digitized image signals are stored in the digital memory 35, coupled to the digital output of the digitizer 33. From the digital image signals in memory 35, the lowest digital value $D_{MIN}$ and the highest digital value $D_{MAX}$ are determined. These values will typically be quite different. If the fast transients are digitized with a good phase setting in the programmable delay circuit 27, the digital values $D_{MIN}$ and $D_{MAX}$ will be dominantly present in the digital memory 35. For a bad phase setting, some of the transients will be sampled in the rising or falling edges, between $D_{MIN}$ and $D_{MAX}$, resulting in digital signal values between $D_{MIN}$ and $D_{MAX}$.

To select the optimal phase automatically, the selected video lines are digitized a number of times with different phase settings and, as described above, a grey score GS is computed for each phase setting. The phase with the lowest grey score GS is selected as the optimal phase setting.

A first phase setting with a delay of 0 nanoseconds (no phase delay) is installed in the programmable delay circuit 27. For the determination of the other phase settings, the sampling period, being the reciprocal of the sampling frequency, is divided by a factor of 20. This time is rounded up to the next higher half nanosecond and established as the phase increment for the different phase settings $\Phi_i$, giving each a grey score $GS_i$, computed as described above. After the selected video lines have been digitized, each of the digital image signals is passed through the look up table defining the grey score for individual digital signals and the output values are summed. This sum, for a specific phase $\Phi_i$, is the grey score $GS_i$. This grey score indicates the amount of grey transients that have been digitized. For each phase setting $\Phi_i$, the corresponding grey score $GS_i$ is stored.

In theory, the best phase $\Phi_i$ is the one with the lowest grey score $GS_{MIN}$. In reality however, there is some jitter on the horizontal sync signals, such that a phase setting is only correct within a few nanoseconds. Taking the lowest grey score $GS_{MIN}$, could result in selecting a first phase setting $\Phi_1$ which differs only a few nanoseconds from a second phase setting $\Phi_2$ having a large grey score $GS_2$, such that a small jitter on the horizontal sync signals will result in a very bad image. To solve this problem, the grey scores of neighbouring phase settings are also considered. For each phase setting, the phase score, being a weighted sum of grey scores is computed. To compute the phase score for phase setting $\Phi_x$, the weight for a grey score $GS_i$ obtained from a phase setting $\Phi_i$ decreases with the absolute phase difference $\Delta\Phi=|\Phi_x-\Phi_i|$. A preferred weight function is given by $w_i=2^{-[\Delta\Phi]}$, where $\Delta\Phi$ is expressed in nanoseconds and [x] means the highest integer value not higher than x. The weight is thus 1 for a phase difference between 0 and 1 nanosecond, ½ between 1 and 2 nanoseconds etc. For a phase difference larger than 7 nanoseconds, the grey scores can be neglected. These weights make sure that a high grey score which is only a few nanoseconds from the phase $\Phi_x$, contributes more to the phase score than phases further away from phase $\Phi_x$. When the fast transients are steep and many successive phase settings have a good grey score, phases that are closest to the center of the stretch of good grey scores get the lowest phase scores.

For each phase setting $\Phi_x$, the phase score is computed as described above and stored. Once the phase scores for all phase settings are evaluated, the lowest phase score is selected and the corresponding phase setting is considered as the optimal phase. This optimal phase setting is installed in the programmable delay circuit 27. For the example described above, for 20 different phase settings, equally distributed over a sampling period of 90 nanoseconds, a grey score is computed. For each new computation, the sampling delay or phase is incremented with 4.5 nanoseconds, corresponding with a digital value of 9. The following scores are found: 18, 9, 2, 0, 0, 0, 0, 0, 0, 0, 6, 18, 28, 54, 76, 100, 91, 78, 39, 23. The phase setting corresponding with the fourth zero is selected, which corresponds to 6*4.5=27 nanoseconds. The optimal phase setting for sampling the analog video signals in the current example is thus 27 nanoseconds.

Figure 5:
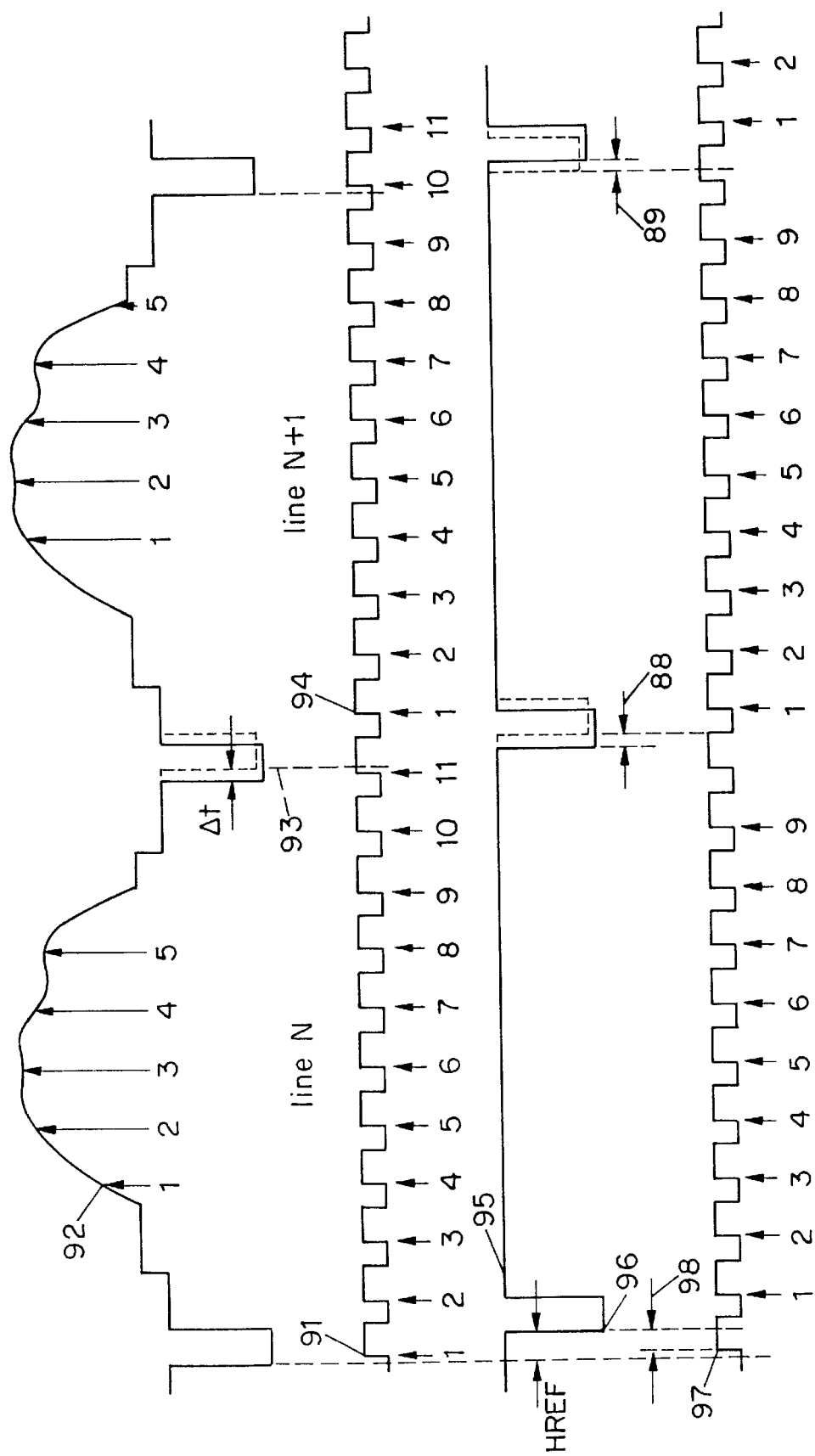
FIG. 5 shows the influence of the synchronisation delay on the numbering of the samples.

As described above, the analog video signals are sampled at each rising edge of the sampling clock signal. The analog signals are not sampled however as long as -hey are outside the active line time. The start of the active line time is always a fixed time after the falling edge of the HSYNC signal. Because the time interval between two consecutive sampling clock signals is constant, the sampling can be started a fixed number of sampling clock cycles after the falling edge of the horizontal sync signal. For this purpose, a counter within the active window delineation circuit 44 is restarted by a signal generated by the falling edge of the horizontal sync signal. The counter counts the rising edges of the sampling clock signal. As soon as a fixed number of rising edges were detected by the counter, the counter enables the sampling clock signal towards the analog video digitizer circuit 33, that digitizes the first signal within the active video line. If a rising edge of the sampling clock signal is very close to the falling edge of the horizontal sync signal, then it is possible that the counter starts either just before or just after said rising edge of the sampling clock signal. In the left part of FIG. 5, the counter is reset just before the rising edge 91 of the sampling clock signal, and this rising edge is given sample number 1. If the active line time starts at sample number 4, then the first low level value 92 is sampled. At the right hand side of FIG. 5, the bold line indicating the SYNC signal has the same location relative to the sampling clock signals. However, due to small variations in signal shape of the horizontal sync signal, a small time delay $\Delta t$ on this signal or an accumulated slight variation of the sampling clock period, it is possible that the falling edge of the HSYNC signal is detected at the dotted line 93, just later than the theoretical position. The counter is reset accordingly just after the rising edge 94 of the sampling clock signal, and the counter starts counting at the next rising edge of the sampling clock signal. It is clear that the fourth pixel, where the active line video is supposed to start, is located one sampling clock period too late. This effect can be seen also from another standpoint. All the sampling clock signals, occurring before the falling edge of the HSYNC signals, will generate digital pixel values belonging to video line N, while all the sampling clock signals occurring after the falling edge of the HSYNC signal, will generate digital pixel values belonging to video line N+1. If the falling edge of the HSYNC signal is close to the rising edge of a sampling clock signal, line N contains M=10 or M+1=11 pixels, dependent on small time variations—often called jitter—on the falling edge of the HSYNC signal. If line N and line N+1 are displayed on a video monitor or imaged on a hard copy, the pixel shift will be clearly visible. In consecutive lines, this effect can become very apparent, when the counter reset signal sometimes occurs just before and sometimes just after the rising edge of the sampling clock signal. Vertical lines and text will show up very jagged in such image. To solve this problem, a HREF adjust circuit 45 is installed, to create a delayed horizontal sync signal 95. The delayed sync signal triggers the counter, such that the falling edge 96 of the delayed HSYNC signal is kept sufficiently far away (98) from the rising edge 97 of the sampling clock signals. In FIG. 5, the same signals are shown, from which it is clear that even considerable variations 88, 89 on the relative location of the falling edge of the horizontal sync signal with respect to the rising edge of the sampling clock signal, does not influence the numbering of the sampling clock signals by the counter. The previous paragraphs described that also the relative position or phase of the sampling clock signals with respect to the falling edge of the horizontal sync signals could be varied by the programmable delay circuit 27. That means that in FIG. 5, the sampling clock signals can shift towards the right, and the situation sketched in conjunction with FIG. 5 is again possible. Therefore, in a preferred embodiment of the invention, the HREF phase shift register can introduce a variable HREF phase shift, preferentially from 7 to 14 nanoseconds, with an accuracy of 1 nanosecond. This HREF phase shift must now be set such that the above described problem can not occur. The position of the falling edge of the HSYNC signals relative to the position of the rising edge of the sampling clock signals is influenced by several parameters, such as the sampling frequency, the pre-scaler setting, etc. such that this relative position is hardly to compute theoretically. Therefore, it is better to establish an optimal setting for the HREF delay by experiment.

Once the sampling frequency and the phase setting are optimally installed, an analog video signal—preferentially containing fast transients—is digitized with all possible settings of the HREF phase shift. For a first setting of the HREF phase shift, the analog video signal is digitized twice or more times, and the digital images obtained this way are compared against each other. Every digitized video line from the first image is compared against the corresponding video line from the second image and—if applicable—to the other digitized images. They are also compared against the corresponding digitized video line, shifted over one pixel. If at least some of the corresponding lines with pixel shift match better than the non-shifted match, the HREF phase shift setting gets a low score. The highest score is reached if all lines of the second and subsequent images match the corresponding non-shifted lines of the first image. For each possible HREF phase setting, a score is computed, and the maximum score, or alternatively the score most distant from the minimum score is determined. The corresponding phase setting is installed in the HREF phase shift register.

Alternatively, the analog video signals, comprising a substantial amount of fast transients, are digitized a first time with the lowest HREF phase setting to give a first digital image, and the same analog video signals are digitized a second time with the highest HREF phase setting to give a second digital image. The corresponding image lines from the first and the second digital image are individually compared against each other a first time without a pixel shift and a second time with a pixel shift. If the match in the first comparison is less correct than the match in the second comparison for some video lines, it is nearly sure that for an intermediate setting of the HREF phase, the rising edges of the sampling clock signal nearly coincide with the falling edges of the HREF signal. To find this critical HREF phase setting, the same analog video signals are digitized a third time, and a match is sought between the first and the second image. If the third image matches most to the second image, then the critical HREF phase setting is further sought between the first and third HREF phase shift setting. As soon as the most critical HREF phase setting is located, the HREF phase setting is installed that has the biggest time difference with the critical HREF phase setting. One must also take into account the fact that the critical HREF phase setting is repeated by the sample period, being the reciprocal of the sampling clock frequency.

A third method to determine experimentally the optimal HREF phase setting is to fix it at a certain setting $HREF_1$, vary the delay setting in the programmable delay circuit 27 and digitize analog video signals containing fast transients, until the critical phase shift setting $\Phi_1$ is found that corresponds to the fixed HREF phase setting $HREF_1$. To assess whether a delay setting is critical, the digital values of one video line containing the largest number of transients within the image and digitized with a previous phase setting is compared against the digital values of the same video line, digitized with the current phase setting. Preferentially, the sampling period is divided in about twenty equal small periods. If such small periods are smaller than the resolution of the phase delay circuit, then the small period is taken equal to that resolution. A first phase shift of 0 nanoseconds is installed and the analog video signals of one video line, containing a large amount of transients, are digitized to a first digital line $DL_1$ with the optimal sampling clock period found by the above procedures. Then a phase delay equal to the above mentioned small period is installed, and the same video line is digitized once to a second digital line $DL_2$. The digital values of line $DL_1$ and $DL_2$ are compared against each other by making a first sum $SUM_1$ over all corresponding pixels of the digital value difference between $DL_1$ and $DL_2$. A second sum $SUM_2$ is computed by adding the absolute values of the difference between pixel 1 of line $DL_1$ and pixel 2 of line $DL_2$, pixel 2 of line $DL_1$ and pixel 3 of line $DL_2$ etc. If $SUM_1$ is smaller than $SUM_2$, no pixel shift has occurred. In the other case, a pixel shift has occurred, and the current phase is flagged as critical with respect to the fixed $HREF_1$ phase setting. A third phase delay is installed and the same video line is sampled in $DL_3$, the sum computed with respect to the samples in $DL_2$, giving new values $SUM_1$ and $SUM_2$. Both sums can be considerably large due to a current phase setting that samples the analog video signals within consecutive pixel transitions. Therefore, a second fixed $HREF_2$ phase setting is also installed, as will be described below.

For $HREF_1=7$ nanoseconds, we find for the above described video format a critical phase setting of 51.5 nanoseconds. In order to estimate the accuracy of the phase correspondence, a second setting $HREF_2$ is fixed, preferentially most different from the first HREF phase setting $HREF_1$ and again the critical phase shift setting $\Phi_2$, corresponding to the HREF phase setting $HREF_2$ is found. For the same video format, we found for $HREF_2=14$ nanoseconds, a critical phase setting of $\Phi_2=60.5$ nanoseconds. Because $HREF_2-HREF_1=7$ nanoseconds and $\Phi_2-\Phi_1=9$ nanoseconds, the measurements are estimated to be correct. Because the optimal phase setting for sampling the analog video signals is 27 nanoseconds, and $HREF_2$ gives the most distant critical phase setting $\Phi_2=60.5$ nanoseconds, the HREF phase setting is set to the value $HREF_2$.

After the sampling clock and sample delay are optimally set, the active window of the analog video signals and the optimal gain and offset settings are determined again and more accurately, in the same way as before. The number of samples preceding the active window are now expressed in relation to the optimal sampling clock period. The widest image with minimum and maximum brightness areas must be transmitted. The black borders around the image—i.e. analog video signals that are close to the video set-up level—will delineate the portions that will be cut off from every subsequent image to be sampled. The first digitization is done with video gain level 0, which corresponds with a 0.3 V gain factor, and video set-up level 0. In the current example, the maximum digital value within the digital image is found to be 100. Based upon this maximum, a new gain level is computed to reach a maximum level of about 214. With a multiplier in the video gain circuit 30 supplied with 0.3 V for digital gain factor 0, and with 1.3 V for digital gain factor 255, the gain factor must thus be 0.3 V * 214/100=0.642 V, which corresponds with a video gain level of (0.642−0.30)*255=87. The video gain level of 87 and video offset of 0 are set, the analog signals are digitized and a new maximum digital value of 218 is found. Again the first video line having at least three pixels with a digital value larger than 218/3=72 or one third of the maximum digital value in the image is found. The same is done for the bottom video lines. As such 29 lines on top and 29 lines at the bottom are estimated to fall without the active window. Over these lines within the active window, the most left and most right pixel are found having a digital value larger than 72. This time 146 pixels at the left side and 51 pixels at the right side are found to be outside the active window. These values are considerably lower than the values of 232 and 84 found before, mainly because the number of samples per horizontal line period is now 720, whereas it was about 1100 before.

The values found for the active window are installed in the active window delineation circuit 44, and the digital values acquired are restricted now to the samples within the active window. The analog video signals are digitized again with the video gain factor 87 and video offset setting of 0. The maximum digital value is now 217. A new gain factor is computed to reach a maximum digital value of 255. Knowing that gain level 0 results in a maximum digital value 100, and gain level 87 results in a maximum digital value 217, we find by simple linear extrapolation that gain level 117 should result in a maximum digital value 255. This video gain level of 117 together with an offset level of 0 are set, and the analog video signals are digitized again, giving an overall minimum digital value of 0 and maximum digital value of 255.

In interlaced video formats, the start of the active horizontal line time gives a first pixel to be captured, the end of this horizontal line time gives a last pixel to be captured, which is the same for both frames. The vertical active frame gives a first line to be captured and a last line to be captured. These line numbers can be different for the first and second field of an interlaced image. Counters in the active window delineation circuit 44 are installed accordingly, in order to digitize only the analog video signals within the active window.

Once an optimal setting for one or more of the above described parameters, that can be electronically set in the video frame grabber according to the current invention, is found, this setting can be directly incorporated in the circuit and analog video signals representing an image can be digitized and the corresponding digital image signals stored in the digital memory for further processing. Alternatively, these parameter settings can be digitally stored in a non-volatile memory means and retrieved each time one or a series of images represented by analog video signals must be acquired by the video frame grabber.

Although the present invention has been described with reference to preferred embodiments, those skilled in the art will recognise that changes may be made in form and detail without departing from the spirit and scope of the invention.

We claim:

1. In a system for digitizing video signals, comprising a video gain means for re-sizing said video signals by amplification or reduction with a video gain factor, a method for the determination of an optimal video gain factor, comprising the following steps:

(a) generating the video signals covering the useful range of analog video signal levels;

(b) setting a video gain factor in said video gain means;

(c) digitizing said re-sized video signals into digital image signals;

(d) finding a digital extreme value—maximum or minimum—of said digital image signals;

(e) repeating steps (b) to (d) for at least two different video gain factor settings;

(f) selecting the optimal video gain factor larger or equal to a maximum video gain factor corresponding to a digital extreme situated within the possible range of digital values for said digital image signals.

2. The method according to claim 1, wherein said video signals are digitized at a predetermined frequency.

3. The method according to claim 2, wherein said frequency is derived from the line rate and the number of video lines corresponding to said video signals.

4. The method according to claim 1, wherein sampling of analog video signals is limited to a rectangular window.

5. The method according to claim 4, wherein the rectangular window is determined by a method comprising the following steps:

digitizing said video signals with said optimal video gain factor;

omitting from said window first and last video lines, having each at most a predetermined number of digital image signal values with a difference from said corresponding digital extreme value smaller than a predetermined difference;

omitting from said window the minimum of first and minimum of last samples in each video line that all have a difference from said corresponding digital extreme value larger than the predetermined difference.

* * * * *

UNITED STATES PATENT AND TRADEMARK OFFICE
CERTIFICATE OF CORRECTION

PATENT NO. : 5,771,078
DATED : June 23, 1998
INVENTOR(S) : Jennes et al.

It is certified that error appears in the above-indentified patent and that said Letters Patent is hereby corrected as shown below:

Column 12, line 45, "$f_{sign}$" should read -- $f_{high}$ --;

Column 14, line 59, "$f_i/f_s$" should read -- $f_i/f_h$ --;

Column 15, line 51, "$f_i$" should read -- $f'_i$ --;

Column 15, lines 63 and 64, "choice with" should read -- choice. With --;

Column 16, line 1, "$f_i$" should read -- $f'_i$ --.

Signed and Sealed this

Twelfth Day of October, 1999

Attest:

Q. TODD DICKINSON

Attesting Officer

Acting Commissioner of Patents and Trademarks